United States Patent Office 3,396,150
Patented Aug. 6, 1968

3,396,150
METHYL AND ALLYL ISOCYANATE COPOLYMER
AND PROCESS THEREFOR
Charles A. Dickson, Newark, and William P. Ter Horst,
Rehoboth Beach, Del., assignors to Chemetron Corporation, Chicago, Ill., a corporation of Delaware
No Drawing. Filed Jan. 25, 1965, Ser. No. 427,949
7 Claims. (Cl. 260—77.5)

ABSTRACT OF THE DISCLOSURE

A polymerized allyl isocyanate and methyl isocyanate copolymer is formed by catalytically polymerizing allyl isocyanate and methyl isocyanate monomers. The copolymers are highly transparent, having low melting ranges and are readily compression molded. The copolymers may be used to make self-supporting films.

---

This invention relates to a novel copolymer and to a novel process for preparing such a copolymer. More particularly, this invention relates to a copolymer of methyl and allyl isocyanate and a novel method for catalyzing the methyl and allyl isocyanate monomers.

There is a great demand for plastic polymers which are transparent yet having a relatively low softening range without shrinkage or decomposition. To be commercially acceptable the polymer should be produced from monomers which are inexpensive and polymerized by a process which can be carried out without the need for specially designed equipment, the use of rare catalysts or the need for solvents which are not readily available. A plastic material to be commercially acceptable should be readily insoluble in common solvents so that films and fibers formed therefrom can be cleaned by common cleaning agents.

It is therefore an object of this invention to provide a novel copolymer and process for preparing the same. It is a further object of this invention to provide a process for preparing a novel copolymer which is highly transparent and which is readily compression molded. It is another object of this invention to provide a novel copolymer which is easily polymerized. It is still another object of this invention to provide a novel copolymer from which fibers and films can be easily produced. These and other objects will be apparent to one skilled in the art from the accompanying description and claims to follow.

The foregoing objects are accomplished by the copolymerization of methylisocyanate and allylisocyanate to produce an allyl-methylisocyanate copolymer by treating the allyl and methyl isocyanate monomers with a catalytic amount of hexamethylenetetramine or a tetramethyldiamino-loweralkane having the formula $$\begin{array}{c} H_3C \\ \phantom{H_3C}\diagdown \\ \phantom{H_3C}\phantom{\diagdown}N-R-N \\ \phantom{H_3C}\diagup \\ H_3C \end{array} \begin{array}{c} CH_3 \\ \diagup \\ \\ \diagdown \\ CH_3 \end{array}$$

wherein R is a disubstituted lower alkane containing 1–7 carbon atoms inclusive, such as described in the following table:

| Derivative | Structure |
|---|---|
| Methylene | —$CH_2$— |
| Ethylene | —$CH_2$—$CH_2$— |
| Propylene | —$CH_2$—$CH_2$—$CH_2$— |
| Isopropylene | —$CH_2$—$CH(CH_3)$— |
| Dimethylmethylene | 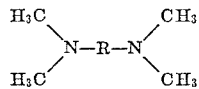 |

| Derivative | Structure |
|---|---|
| Butylene | —$CH_2$—$(CH_2)_2$—$CH_2$— |
| Isobutylene | —$CH_2$—$CH(CH_3)$—$CH_2$— |
| Secondary butylene | —$CH_2$—$CH(CH_3)$—$CH_2$—$CH_3$ |
| Pentylene | —$CH_2$—$(CH_2)_3$—$CH_2$— |
| Dimethylmethylene | $C_2H_5$—$C(C_2H_5)$— |
| Methylpropylmethylene | $CH_3$—$C(C_3H_7)$— |
| 2,2-dimethylpropylene | —$CH_2$—$C(CH_3)(CH_3)$—$CH_2$— |
| Hexylene | —$CH_2$—$(CH_2)_4$—$CH_2$— |
| 1,1,2,2-tetramethylethylene | —$C(CH_3)(CH_3)$—$C(CH_3)(CH_3)$— |
| 1-methyl-1-ethyl-2-methylethylene | —$C(CH_3)(C_2H_5)$—$C(CH_3)$— |
| 2,2-dimethylpropylene | —$CH_2$—$C(CH_3)(CH_3)$—$CH_2$— |
| Heptylene | —$CH_2$—$(CH_2)_5$—$CH_2$— |
| 2,2-diethylpropylene | —$CH_2$—$C(C_2H_5)(C_2H_5)$—$CH_2$— |
| 2,2,3-tetramethylbutylene | —$CH_2$—$C(CH_3)(CH_3)$—$CH(CH_3)$—$CH_2$— |
| 3,3-dimethylpentylene | —$CH_2$—$CH_2$—$C(CH_3)(CH_3)$—$CH_2$—$CH_2$— |

The formation of the allyl-methylisocyanate copolymer is highly unexpected because allylisocyanate will not copolymerize with ethyl, propyl, butyl or octadecylisocyanate. Neither does methylisocyanate copolymerize with any of the four previously mentioned alkyl isocyanates.

The allylisocyanate-methylisocyanate copolymer of this invention is soluble in chloroform and methylenechloride but insoluble in common solvents such as carbontetrachloride and trichloroethylene. This is in contrast to the homopolymer of methylisocyanate which is soluble only in chloroform. It has a softening range of 150–192° C. and is completely molten at 192° C. without shrinkage or decomposition. The novel copolymer is also soluble in trifluoroethanol and in dichloroacetic acid but the copolymer degrades in these solvents. Thus, this is an effective means to depolymerize the copolymer. For example, the glass-like copolymer can be dissolved in chloroform containing dichloroacetic acid and after four hours reaction time there is contained a rubbery transparent plastic that remains rubbery at Dry Ice temperature (−78° C.). The amount of the hexamethylenetetramine or tetramethyldiamino-loweralkane catalyst is not critical. Five percent by weight based on the total amount of the allyl and methylisocyanate monomers is employed but the amount can be reduced to one percent without affecting polymerization. A temperature of about 50° C. is preferred during polymerization but a temperature of from 10° C. to 80° C. is also operable. However, a range of about 40° C. to about 80° C. is preferred.

The copolymerization can be carried out in bulk or a suitable solvent such as diethyl carbonate, dimethylformamide or dioxane. The use of a solvent such as dioxane for side reaction products is preferred as some minor amounts of dimer and trimer formed during polymerization are soluble in the dioxane whereas the novel copolymer is not. Further, with the use of the solvent the catalization can be controlled to a greater extent. The copolymerization of allyl and methylisocyanate can be carried out in the presence of air or nitrogen without any undesirable effects.

The outstanding properties of the copolymer of this invention are its transparency and its low temperature melting range without excessive shrinkage or decomposition. Thus, these properties make the novel copolymer useful in compression molding to make shaped articles. The copolymer of this invention in the form of films can be employed as a transparent packaging material especially in view of the fact that it can be readily heat sealed.

The following specific examples are intended for the purpose of illustrating the present invention. They should not be construed as limiting the invention to the precise reactants, ingredients or conditions specified.

Example I

Into a 3000 milliliter three neck reaction flask provided with a reflux condenser and thermometer were charged 20 grams of methylisocyanate, 20 grams of allylisocyanate, 20 grams of dimethylformamide and one gram of hexamethylenetetramine. Heat was applied to attain a temperature of 41° C. whereupon a liquefied clear polymer begins to form. The temperature was raised to 51° C. and maintained for a period of three hours. The allyl-methylisocyanate copolymer was collected in bulk in the form of a solid chunk. The copolymer is a somewhat pliable resin and was obtained in the amount of 40 grams. When heated the copolymer begins to soften at 70° C, at 95° C. it begins to flow and at 178° C. it melts. The allyl-methylisocyanate copolymer is soluble in methylenechloride as well as chloroform and 2-chloroethylchloroformate.

Example II

Into a 12 liter round bottom flask provided with a stirrer, reflux condenser and thermometer was charged 200 grams of methylisocyanate, 200 grams of allylisocyanate, 800 grams of diethylcarbonate and 20 grams of hexamethylenetetramine. Heat was applied along with agitation and at 75° C. a liquefied polymer begins to form. The temperature was held at 75–77° C. for four hours with agitation and under mild reflux conditions. Allyl-methylisocyanate copolymer formed and was obtained in the form of a solid mass and air dried. The copolymer was found to be thermoplastic having a softening temperature of 68° C., a flowing temperature of 155° C. and becoming completely molten at 185° C.

Example III

Into the same type of flask as described in Example II was charged 400 grams of methylisocyanate, 400 grams of allylisocyanate and 20 grams of hexamethylenetetramine. The upper half of the flask and reflux condenser were externally cooled with Dry Ice in acetone. Heat was applied to the extent that mild refluxing takes place and this condition was maintained for three hours. Subsequently, the entire inside of the flask was covered with clear polymer. The unreacted isocyanate monomers were evaporated off resulting in a yield of 608 grams of a clear, hard and tough allyl-methylisocyanate copolymer softening at 70° C., flowing at 155° C. and melting 180° C. A nonsupported film cast from a 2% solution of copolymer in chloroform was clear, flexible and strong.

Example IV

Into a 500 milliliter reaction flask provided with a reflux condenser and thermometer were charged 20 grams of methylisocyanate, 20 grams of allylisocyanate and 2 grams of tetramethylpropylenediamine. Heat was applied and at a temperature of 52° C., mild refluxing takes place and a polymer begins to form. After two hours of refluxing polymerization is substantially complete and the entire inside of the flask was covered with clear allyl-methylisocyanate copolymer. Subsequently, the unreacted isocyanate monomers were evaporated off yielding 31.7 grams of allyl-methylisocyanate copolymer which softens at 175° C., melts at 185° C. to a heavily viscous liquid and at 195° C. becomes thin and flows freely.

The novel copolymer was found to have the following analysis: C, 47.14%; H, 6.10%; N, 19.51%; O, 25.99%. A second elemental analysis gave the following results: C, 46.86%; H, 6.18%; N, 19.61%; O, 25.69%.

Infrared absorption spectra of the allyl-methylisocyanate copolymer indicated the following:

| Vibration mode: | Wave length (microns) |
|---|---|
| =C—H (stretch) | 3.30 |
| C=C (stretch) | 6.10 |
| =CH (wag) | 10.10 |
| | 10.91 |
| —OH (stretch) | 3.0–3.06 |
| —OH (bend) | 6.29–6.45 |

A nonsupported film cast from a chloroform solution is clear, flexible and strong.

Example V

Into a 500 milliliter flask equipped with a condenser, thermometer and stirrer were placed 57 grams of methylisocyanate, 83 grams of allylisocyanate and three grams of tetramethylpropylenediamine. The resulting reaction mixture was heated under reflux for six hours. The temperature was 51° C. at the start and 86° C. at the end of the six hour period. Subsequently, the unreacted isocyanate monomers were evaporated off yielding an allyl-methylisocyanate copolymer in the amount of 110.5 grams in the form of a solid chunk softening at 77° C. flowing at 177° C. and completely molten at 183° C. The methylallylisocyanate copolymer has the following elemental analysis: C, 51.07%; H, 6.34; N, 20.75%; O, 22.27%. A second analysis of the copolymer produced in this example showing the following: C, 51.24%; H, 6.26% N, 20.54%; O, 22.17%.

Infrared absorption spectra of the methyl-allylisocyanate copolymer indicated the following:

| Vibration mode: | Wave length (microns) |
|---|---|
| =C—H (stretch) | 3.30 |
| C=C (stretch) | 6.15 |
| =CH (wag) | 10.10 |
| | 10.85 |
| OH (stretch) | 3.0–3.06 |
| OH (bend) | 6.29–6.45 |

A film cast from a chloroform solution is clear, flexible and very tough.

Example VI

Into a 500 milliliter reaction flask provided with reflux condenser and thermometer were charged 20 grams of methylisocyanate, 5 grams of allylisocyanate and one gram of hexamethylenetetramine. Heat was applied to the resulting reaction mixture and at a temperature of 40° C. mild refluxing takes place. After one-half hour the temperature of the reaction mixture was 57° C. and considerable copolymer had formed. The resulting mass was kept at 57–64° C. for another one-half hour at which time the copolymerization was substantially complete and any unreacted isocyanate monomers were evaporated off resulting in a 17 gram yield of a clear copolymer. A non-supported film cast from a chloroform solution was clear, flexible and strong. The allylmethylisocyanate copolymer is thermoplastic, beginning to soften at 88° C., flowing at 160° C. and forming a crystal clear viscous liquid which is all molten at 186° C. The copolymer is also soluble in methylenechloride.

From the foregoing description it will now be seen that there is provided a novel copolymer which is transparent, thermoplastic and can be formed into shaped articles, or cast from solutions into films or fibers yet is insoluble in most cleaning solvents. The process by which the novel copolymer is formed is carried out easily without the need for low temperatures, solvents and consequently special equipment and special handling. The process results in yields which are nearly quantitative without the formation of excessive side reactant products.

All of the tetramethyldiamino-loweralkane compounds employed in the process of the present invention, and described in the general formula preceding the table, are either commercially available or may be conveniently prepared by known reactions. For example, one method for preparing the tetramethyldiamino-loweralkanes is to react two moles of dimethylamine with the corresponding lower alkylenedichloride in the manner well known to those skilled in the art.

Others may practice the invention in any of the numerous ways which will be suggested by this disclosure to one skilled in the art by employing one or more of the novel features disclosed or equivalents thereof. All such practice of the invention is considered to be part hereof provided it falls within the scope of the appended claims.

We claim:

1. A process for producing a copolymer having a softening range of about 150° C. to about 192° C. and which is soluble in chloroform or methylenechloride, which comprises copolymerizing methyl isocyanate and allylisocyanate at a temperature between about 10° C. and 80° C. in the presence of a catalyst selected from the group consisting of hexamethylenetetramine and tetramethyldiamino-loweralkane having the formula:

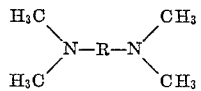

wherein R is a lower alkane containing 1 to 7 carbon atoms.

2. The copolymer produced by the process of claim 1.

3. The copolymer of claim 1 in the form of a self-supported transparent film.

4. The process as defined in claim 1 wherein the amount of said hexamethylenetetramine is in the range of about 1.0% to about 5.0% by weight based on the total weight of said monomers.

5. The process as defined in claim 1 wherein the catalyst is tetramethylpropylenediamine and is present in the range of about 1.0% to about 5.0% by weight based on the total weight of said monomers.

6. The process as defined in claim 1 wherein the temperature during the reaction is in the range of about 40° C. to about 80° C.

7. The process as defined in claim 1 wherein a solvent is employed during copolymerization.

References Cited
UNITED STATES PATENTS

| | | | |
|---|---|---|---|
| 2,965,614 | 12/1960 | Shashoua | 260—77.5 |
| 3,200,103 | 8/1965 | Chadha | 260—89.1 |
| 3,225,119 | 12/1965 | Baker | 260—89.1 |
| 3,242,140 | 3/1966 | Hoover | 260—77.5 |
| 3,300,432 | 1/1967 | Tarricone et al. | 260—29.6 |

OTHER REFERENCES

Chemical Abstracts, vol. 21, No. 9, pp. 1632–1633, May 10, 1927.

Shashous et al.: "The Homopolymerization of Mono-isocyanates," J. Am. Chem. Soc., vol. 82, pp. 866–873, Feb. 20, 1960.

DONALD E. CZAJA, *Primary Examiner.*

F. McKELVEY, *Assistant Examiner.*

UNITED STATES PATENT OFFICE
CERTIFICATE OF CORRECTION

Patent No. 3,396,150                                       August 6, 1968

Charles A. Dickson et al.

It is certified that error appears in the above identified patent and that said Letters Patent are hereby corrected as shown below:

Column 2, lines 21 to 25, the structure formula for "1,1,2,2-tetramethylethylene" should appear as shown below:

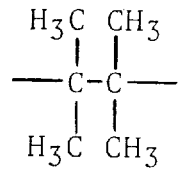

same column 2, lines 34 to 37, the structure formula for "2,2-diethylpropylene" should appear as shown below:

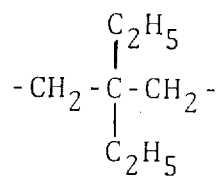

Column 4, line 51, "H, 6.34" should read -- H, 6.34% --.

Signed and sealed this 13th day of January 1970.

(SEAL)
Attest:

EDWARD M. FLETCHER, JR.
Attesting Officer

WILLIAM E. SCHUYLER, JR.
Commissioner of Patents